United States Patent
Pauken et al.

(10) Patent No.: US 12,272,959 B2
(45) Date of Patent: Apr. 8, 2025

(54) CONNECTABLE POWER STATIONS

(71) Applicant: Champion Power Equipment, Inc., Santa Fe Springs, CA (US)

(72) Inventors: Greg Pauken, Hartland, WI (US); James J. Dehn, Brookfield, WI (US); Zhikun Zhong, New Berlin, WI (US); Artur Starosciak, Greendale, WI (US)

(73) Assignee: Champion Power Equipment, Inc., Las Vegas, NV (US)

( * ) Notice: Subject to any disclaimer, the term of this patent is extended or adjusted under 35 U.S.C. 154(b) by 6 days.

(21) Appl. No.: 18/481,115

(22) Filed: Oct. 4, 2023

(65) Prior Publication Data

US 2024/0120747 A1   Apr. 11, 2024

Related U.S. Application Data

(60) Provisional application No. 63/378,448, filed on Oct. 5, 2022.

(51) Int. Cl.
*H02J 3/50* (2006.01)
*H01M 10/0525* (2010.01)
(Continued)

(52) U.S. Cl.
CPC .......... *H02J 3/50* (2013.01); *H01M 10/0525* (2013.01); *H01M 10/482* (2013.01); *H01M 10/488* (2013.01); *H01M 50/244* (2021.01); *H01M 50/251* (2021.01); *H01M 50/256* (2021.01); *H01M 50/258* (2021.01); *H01M 50/264* (2021.01); *H01M 50/269* (2021.01);
(Continued)

(58) Field of Classification Search
CPC .... H02J 3/50; H02J 7/00; H02J 7/0048; H02J 3/00; H02J 3/007; H02J 7/34; H02J 7/342; H02J 3/32; H02J 3/38; H02J 3/381; H01M 50/269; H01M 50/251; H01M 50/264; H01M 50/244; H01M 50/256; H01M 50/258; H01M 50/298; H01M 10/0525; H01M 10/482; H01M 10/48; H01M 10/488; H02H 1/0007; H02H 7/122; H02H 1/00; H02M 7/00; H02M 7/003

See application file for complete search history.

(56) References Cited

U.S. PATENT DOCUMENTS

2009/0296442 A1   12/2009   Chang et al.
2013/0183562 A1   7/2013    Workman et al.
(Continued)

OTHER PUBLICATIONS

Inergy, Flex User Manual, Jul. 2, 2022, pp. 1-55, retrieved from Internet Archive Wayback Machine http://web.archive.org/web/20220702151026/https:/cdn.shopify.com/s/files/1/1654/8245/files/Flex_User_Manual_WEB_v1.2.pdf?v=1636499268 on Jan. 24, 2023.
(Continued)

*Primary Examiner* — Robert L Deberadinis
(74) *Attorney, Agent, or Firm* — Ziolkowski Patent Solutions Group, SC

(57) ABSTRACT

A power station assembly includes two inverter power stations configured to provide respective power outputs at a voltage and at respective currents. The power station assembly additionally includes a linking module configured to electrically connect to the two inverter power stations to receive the respective power outputs therefrom, combine the respective power outputs into a combined power output, and provide the combined power output to a load.

28 Claims, 8 Drawing Sheets

(51) Int. Cl.

| | |
|---|---|
| *H01M 10/48* | (2006.01) |
| *H01M 50/244* | (2021.01) |
| *H01M 50/251* | (2021.01) |
| *H01M 50/256* | (2021.01) |
| *H01M 50/258* | (2021.01) |
| *H01M 50/264* | (2021.01) |
| *H01M 50/269* | (2021.01) |
| *H01M 50/298* | (2021.01) |
| *H02H 1/00* | (2006.01) |
| *H02H 7/122* | (2006.01) |
| *H02J 3/00* | (2006.01) |
| *H02J 3/32* | (2006.01) |
| *H02J 3/38* | (2006.01) |
| *H02J 3/46* | (2006.01) |
| *H02J 7/00* | (2006.01) |
| *H02J 7/34* | (2006.01) |
| *H02M 7/00* | (2006.01) |
| *H02J 7/35* | (2006.01) |

(52) U.S. Cl.
CPC ........ *H01M 50/298* (2021.01); *H02H 1/0007* (2013.01); *H02H 7/122* (2013.01); *H02J 3/007* (2020.01); *H02J 3/32* (2013.01); *H02J 3/381* (2013.01); *H02J 3/46* (2013.01); *H02J 7/0013* (2013.01); *H02J 7/0045* (2013.01); *H02J 7/0048* (2020.01); *H02J 7/0063* (2013.01); *H02J 7/342* (2020.01); *H02M 7/003* (2013.01); *H01M 2220/10* (2013.01); *H02J 7/35* (2013.01); *H02J 2207/20* (2020.01); *H02J 2300/10* (2020.01); *H02J 2300/24* (2020.01)

(56) References Cited

U.S. PATENT DOCUMENTS

| | | |
|---|---|---|
| 2017/0094823 A1 | 3/2017 | Montazeri |
| 2018/0006470 A1 | 1/2018 | Stacey et al. |
| 2018/0309098 A1 | 10/2018 | Ryou et al. |
| 2019/0319231 A1 | 10/2019 | Nguyen |
| 2021/0050725 A1 | 2/2021 | Jensen et al. |
| 2021/0273464 A1 | 9/2021 | Vasefi et al. |
| 2021/0376635 A1 | 12/2021 | Luangrath et al. |
| 2022/0149641 A1 | 5/2022 | Silva et al. |

OTHER PUBLICATIONS

Lion Energy LLC, Lion Safari ME Lithium Iron Phosphate Solar Generator User Manual, Nov. 29, 2021, pp. 1-12, retrieved from Internet Archive Wayback Machine http://web.archive.org/web/20211129205209/https:/lionenergy.sirv.com/manuals/50170125/Lion_Energy_Safari_ME_Manual_08252020.pdf on Jan. 24, 2023.
Lion Energy LLC, Lion Safari ME, Web page https://lionenergy.com/products/lion-safari-me, Nov. 27, 2021, retrieved from Internet Archive Wayback Machine http://web.archive.org/web/20211127025830/https:/lionenergy.com/products/lion-safari-me on Jan. 24, 2023.
Natures Generator Inc., Nature's Generator Powerhouse, Web page https://naturesgenerator.com/products/nature-s-generator-powerhouse, Sep. 30, 2022, retrieved from Internet Archive Wayback Machine http://web.archive.org/web/20220930192626/https://naturesgenerator.com/products/nature-s-generator-powerhouse on Jan. 24, 2023.
EcoFlow, EcoFlow DELTA Pro Portable Power Station, Web page https://us.ecoflow.com/products/delta-pro-portable-power-station, Mar. 8, 2022, retrieved from Internet Archive Wayback Machine http://web.archive.org/web/20220308234249/https:/us.ecoflow.com/products/delta-pro-portable-power-station on Jan. 25, 2023.
Bluetti, DC Charging Enhancer (D050S), Web page https://www.bluettipower.com/products/dc-charging-enhanncer-d050s?_pos=6&_sid=5bc362d8d&_ss=r, Aug. 2022 [retrieved on Jan. 24, 2023].
Bluetti, B230 & B300 Expansion Battery, Web page https://www.bluettipower.com/pages/expansion-battery, Jul. 25, 2022, retrieved from Internet Archive Wayback Machine http://web.archive.org/web/20220725070918/https://www.bluettipower.com/pages/expansion-battery on Jan. 27, 2023.
Bluetti, Bluetti AC300 Inverter Module Generator, Web page https://www.bluettipower.com/products/bluetti-ac300-inverter-module-generator, Apr. 13, 2022, retrieved from Internet Archive Wayback Machine http://web.archive.org/web/20220413000952/https://www.bluettipower.com/products/bluetti-ac300-inverter-module-generator on Jan. 27, 2023.
Bluetti, AC300 Fusion Box(P030A), Web page https://www.bluettipower.com/products/fusion-box-pro-p030a?pr_prod_strat=copurchase&pr_rec_id=abc3d89f5&pr_rec_pid=6936966627503&pr_ref_pid=7587816505563&pr_seq=uniform, Apr. 28, 2022, retrieved from http://web.archive.org/web/20220428223805mp_/https:/www.bluettipower.com/products/fusion-box-pro-p030a?pr_prod_strat=copurchase&pr_rec_id=abc3d89f5&pr_rec_pid=6936966627503&pr_ref_pid=7587816505563&pr_seq=uniform on Jan. 24, 2023.
Bluetti, Bluetti AC300 Portable Power Station User Manual, Jun. 14, 2022, pp. 1-50, retrieved from Internet Archive Wayback Machine http://web.archive.org/web/20220614002613/https:/cdn.shopify.com/s/files/1/0536/3390/8911/files/AC300.pdf?v=1648111835 on Jan. 24, 2023.
Goal Zero, 4800WH Yetiexpansion System, Web Page https://www.goalzero.com/collections/home-energy-storage-kits/products/4-8-kwh-yeti-expansion-kit, May 16, 2022, retrieved from Internet Archive Wayback Machine https://web.archive.org/web/20220516082934/https:/www.goalzero.com/collections/home-energy-storage-kits/products/4-8-kwh-yeti-expansion-kit on Jan. 24, 2023.
Goal Zero, Yetix 600W Power Supply, Web page https://www.goalzero.com/collections/power-station-accessories/products/yeti-x-600w-power-supply, May 16, 2022, retrieved from Internet Archive Wayback Machine http://web.archive.org/web/20220516084058/https://www.goalzero.com/collections/power-station-accessories/products/yeti-x-600w-power-supply on Jan. 24, 2023.
Goal Zero, Yeti 1000X Portable Power Station, Web page https://www.goalzero.com/collections/portable-power-stations/products/goal-zero-yeti-1000x-portable-power-station, Apr. 25, 2022, retrieved from Internet Archive Wayback Machine http://web.archive.org/web/20220425192006/https:/www.goalzero.com/collections/portable-power-stations/products/goal-zero-yeti-1000x-portable-power-station on Jan. 24, 2023.
Firman Power Equipment, Firman Operator's Manual Zero E Portable Power Station, Aug. 2022 [retrieved on Jan. 24, 2023], pp. 1-27, retrieved from the Internet: https://cdn.shopify.com/s/files/1/0601/8976/9969/files/ZERO_E_Manual_English.pdf?v=1657647542.
Renogy, Lycan 5000 Power Box RPB4835OA-48LFPA12S User Manual, May 17, 2022, pp. 1-65, retrieved from Internet Archive Wayback Machine http://web.archive.org/web/20220517211111/https:/store-fhnch.mybigcommerce.com/content/LYCAN/LYCAN%205000%20Power%20Box.pdf on Jan. 24, 2023.
Vtoman, Vtoman Extra Battery 1548Wh for Jump 1000/1500X/1500 Portable Power Station, Web page https://vtoman.com/collections/power-station/products/1548wh-backup-battery, Oct. 3, 2022, retrieved from Internet Archive Wayback Machine https://web.archive.org/web/20221003182614/https:/vtoman.com/collections/power-station/products/1548wh-backup-battery on Jan. 24, 2023.
Pecron LLC, Pecron E2000LFP Expandable Portable Power Station, Web page https://www.pecron.com/products/pecron-e2000lfp-portable-power-station, Jun. 19, 2022, retrieved from Internet Archive Wayback Machine http://web.archive.org/web/20220619062419/https://www.pecron.com/products/pecron-e2000lfp-portable-power-station on Jan. 27, 2023.
Shenzhen Enershare Technology Co.,Ltd, Built in Inverter BMS Solar Lithium Battery, Web page https://www.enersharepower.com/30kwh-all-in-one-battery/62478890.html, Aug. 2022 [retrieved on Jan. 24, 2023].

(56) References Cited

OTHER PUBLICATIONS

Generac Power Systems, Inc., Generac Introduces Portable Power Stations, Sep. 26, 2022 [retrieved on Jan. 24, 2023], pp. 1-2, retrieved from the internet: https://investors.generac.com/node/13776/pdf.

Generac Power Systems, Inc., GB1000 & GB2000 Portable Power Stations, Oct. 5, 2022, pp. 1-3, retrieved from Internet Archive Wayback Machine https://web.archive.org/web/20221005173559/https://www.generac.com/generaccorporate/media/library/content/all-products/portable-recreational-power/iq%20series/iq2000/gb1000_gb2000_sellsheet_2022_digital_f11_1.pdf on Jan. 25, 2023.

Generac Power Systems, Inc., Generac GB1000 Power Station Parts Manual Model: G0080250, Oct. 5, 2022, pp. 1-4, retrieved from Internet Archive Wayback Machine https://web.archive.org/web/20221005171542/https://www.generac.com/generaccorporate/media/library/content/all-products/portable-recreational-power/GB%20series/a0002454690.pdf on Jan. 25, 2023.

Generac Power Systems, Inc., GB1000 and GB2000, Oct. 5, 2022, pp. 1-2, retrieved from Internet Archive Wayback Machine https://web.archive.org/web/20221005174016/https://www.generac.com/generaccorporate/media/library/content/all-products/portable-recreational-power/iq%20series/a0002721890.pdf on Jan. 28, 2023.

Generac Power Systems, Inc., Generac GB1000 and GB2000 Portable Power Station Owner's Manual, Oct. 5, 2022, pp. 1-48, retrieved from Internet Archive Wayback Machine https://web.archive.org/web/20221005172201/ https://www.generac.com/generaccorporate/media/library/content/home-solutions/portable-recreational-power/a0002236216_1.pdf on Jan. 25, 2023.

Champion Power Equipment, Inc., Operator's Manual Model #100468 ParaLINK Parallel Kit, Oct. 2018 [retrieved on Jan. 25, 2023], pp. 1-10, retrieved from the Internet: https://www.championpowerequipment.com/wp-content/uploads/2018/10/100468-om-english.pdf.

Champion Power Equipment, Inc., Operator's Manual Model #100125 Parallel Kit, Apr. 2018 [retrieved on Jan. 25, 2023], pp. 1-6, retrieved from the Internet: https://www.championpowerequipment.com/wp-content/uploads/2018/04/100125-om-english.pdf.

Champion Power Equipment, Inc., Black Diamond Operator's Manual Model #BD201103 ParaLINK Parallel Kit, Apr. 2021 [retrieved on Jan. 25, 2023], pp. 1-12, retrieved from the Internet: https://www.championpowerequipment.com/wp-content/uploads/2021/04/201103-om-english.pdf.

Champion Power Equipment, Inc., Operator's Manual Model #100740 ParaLINK Parallel Kit, Mar. 2021 [retrieved on Jan. 28, 2023], pp. 1-12, retrieved from the Internet: https://www.championpowerequipment.com/wp-content/uploads/2021/03/100740-om-english.pdf.

Champion Power Equipment, Inc., Operator's Manual Model #100333 ParaLINK Parallel Kit, Aug. 2017 [retrieved on Jan. 25, 2023], pp. 1-10, retrieved from the Internet: https://www.championpowerequipment.com/wp-content/uploads/2017/08/100333-om-english.pdf.

Champion Power Equipment, Inc., Champion Power Equipment Owner's Manual Parallel Kit Model No. 100319, Aug. 2017 [retrieved on Jan. 25, 2023], pp. 1-9, retrieved from the Internet: https://www.championpowerequipment.com/wp-content/uploads/2017/08/100319-om-english.pdf.

Champion Power Equipment, Inc., Operator's Manual Model #73500i Parallel Operation Kit, Aug. 2017 [retrieved on Jan. 25, 2023], pp. 1-6, retrieved from the Internet: https://www.championpowerequipment.com/wp-content/uploads/2017/08/73500i-om-english.pdf.

CONNECTABLE POWER STATIONS

CROSS-REFERENCE TO RELATED APPLICATIONS

The present application is a non-provisional of and claims priority to U.S. Provisional Patent Application Ser. No. 63/378,448, filed Oct. 5, 2022, the disclosure of which is incorporated herein by reference in its entirety.

BACKGROUND OF THE INVENTION

Embodiments of the present invention relate to gasless inverter generators or power stations that are connectible and, more particularly, to a system for increasing power output or energy capacity available to an electrical load by connecting the power stations.

Generators or generator systems are useful as mobile or backup power sources. Inverter generator systems may include traditional or gas generators powered by fossil fuels, such as, for example, gasoline, liquefied petroleum gas (LPG), or natural gas (NG), or gasless inverter generators/inverter power stations powered by battery systems. Regardless, they can provide power in locations without access to the utility grid or when natural disasters, extreme weather events, or other conditions result in a power outage. However, gas generators require a constant supply of fuel for combustion, and that fuel might not be readily available, particularly in remote locations and when natural disasters or severe weather interrupts the fuel supply. Further, these types of generators contribute to global warming, require frequent maintenance, and emit hazardous exhaust and noise, which makes them unsuitable for indoor environments.

Inverter power stations include battery systems that can store electrical energy for use in locations without access to the utility grid or when a power outage occurs in the grid. Inverter power station users can charge these battery systems with energy from various sources such as, for example, the utility grid using a converter or rectifier that changes alternating current ("AC") power into direct current ("DC") power. Alternatively, such users may elect to charge their battery systems with energy from carbon-free renewable energy sources, the use of which generally reduces dependence on fossil fuels and lowers energy bills. As an example, solar panels can charge battery systems to provide a renewable source of stored energy independent from the utility grid, which is convenient for many mobile and off-grid applications. Battery systems can include batteries connected in series or in parallel to expand capacity in terms of voltage and/or current and can power electrical devices that require AC power using an inverter that transforms DC power into AC power.

Portable gasless inverter power stations often have a small size that allows them to be transportable. The size of these portable power stations can determine the space available for onboard battery systems and associated power electronics used to power electrical loads connected to the power stations. As a result, the energy capacity and available power output of a power station are often limited due to the portable nature of the power station. In addition, portable power stations often have power output receptacles couplable to an electrical load and that have a power rating based on the available power output of the power station. However, some loads may require connection to a power output receptacle with a higher power rating than what a smaller power station provides. Unfortunately, a larger power station that includes a higher rated power output receptacle can be hard to transport, requires a larger footprint, and can be more costly.

Therefore, it would be desirable to provide a power station that is powered by a battery system and that can be combined with another power source to increase the power or energy capacity available to a load.

BRIEF STATEMENT OF THE INVENTION

Embodiments of the present invention relate to a power station connectable to another power station to increase energy and power available to power a load.

In accordance with one aspect of the invention, a power station assembly includes a first inverter power station configured to provide a first AC power output at an AC voltage and a first AC current at or below a first AC current rating and a second inverter power station configured to provide a second AC power output at the AC voltage and a second AC current at or below a second AC current rating. The power station assembly additionally includes a linking module configured to electrically connect to the first inverter power station to receive the first AC power output therefrom, electrically connect to the second inverter power station to receive the second AC power output therefrom, combine the first and second AC power outputs into a third AC power output at the AC voltage and a third AC current that is a combination of the first and second AC currents, and provide the third AC power output to a load at the AC voltage and the third AC current at or below a third AC current rating that is a combination of the first and second AC current ratings.

In accordance with another aspect of the invention, a gasless inverter generator system includes a first gasless inverter generator having at least one AC power output receptacle configured to provide a first AC power output at an AC voltage and a first AC current not exceeding a first AC current rating and a second gasless inverter generator having at least one AC power output receptacle configured to provide a second AC power output at the AC voltage and a second AC current not exceeding a second AC current rating. The gasless inverter generator system further includes a linking kit electrically connectable to the at least one AC power output receptacle of the first gasless inverter generator and the at least one AC power output receptacle of the second gasless inverter generator to receive the first and second AC power outputs therefrom and combine the first and second AC power outputs into a third AC power output. The linking kit includes at least one AC power output receptacle configured to provide the third AC power output at the AC voltage and a third AC current that is a combination of the first and second AC currents and that does not exceed a third AC current rating. The third AC current rating is higher than each of the first and second AC current ratings.

In accordance with yet another aspect of the invention, a linking module is configured to electrically connect to a first inverter power station to receive a first AC power output at an AC voltage and a first AC current less than or equal to a first AC current rating, electrically connect to a second inverter power station to receive a second AC power output at the AC voltage and a second AC current less than or equal to a second AC current rating, electrically connect the first and second AC power outputs in parallel to combine the first and second AC power outputs into a third AC power output at the AC voltage and a third AC current that is a combination of the first and second AC currents, and provide the third AC power output to a load.

In accordance with yet another aspect of the invention, a power station assembly includes two connectable inverter power stations and a linking module configured to electrically connect the two connectable inverter power stations. Each of the two connectable inverter power stations includes a first rated AC power output at a first voltage rating and a first current rating. When the linking module electrically connects the two connectable inverter power stations, the power station assembly is capable of providing a second rated AC power output at the first voltage rating and a second current rating higher than the first current rating.

These and other advantages and features of the present invention will be more readily understood from the following detailed description and the accompanying drawings.

BRIEF DESCRIPTION OF THE DRAWINGS

The drawings illustrate embodiments presently contemplated for carrying out the invention.

In the drawings.

DETAILED DESCRIPTION

The operating environment of the invention is described herein with respect to a portable power station. However, those skilled in the art will appreciate that the invention is equally applicable for use with nonportable power stations. Furthermore, while the invention is described with respect to a portable battery-operated power station having an inverter that converts DC power to AC power, embodiments of the invention are equally applicable for use with battery-operated power stations having a DC-to-DC power converter.

Figure 1:
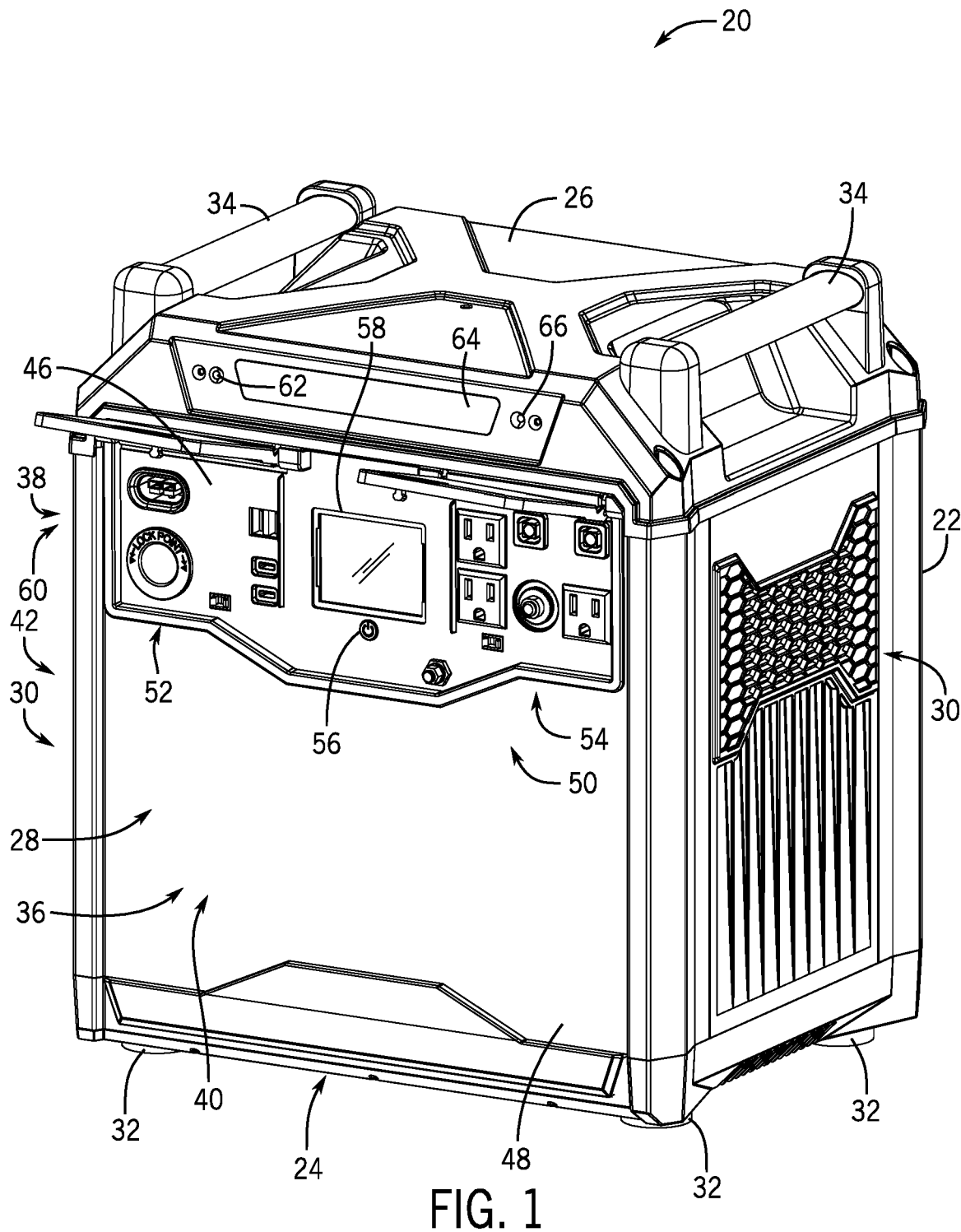
FIG. 1 is an upper-right front perspective view of a power station, according to an embodiment of the invention.

Referring to FIG. 1, an upper-right front perspective view of a portable power station 20 for providing power to electrical devices (not shown in FIG. 1) is shown, according to an embodiment of the invention. The power station 20 includes a housing 22 having a base 24, a top wall or upper surface 26, and a plurality of sidewalls 28 that surround and protect internal components of the power station 20. Cooling vents 30 are positioned in one or more of the sidewalls 28 to provide cooling air to components within the housing 22. The power station 20 may include a plurality of feet 32 extending downward from the base 24 to provide a stable foundation and to raise the housing 22 slightly off of the floor or ground. The power station 20 may include a pair of carrying handles 34 extending upward from the top wall 26 to lift and carry the power station 20. While the carrying handles 34 are shown in FIG. 1 as being oval-shaped, in various embodiments, the carrying handles 34 may have another shape that is comfortable to a user. A single person may be able to lift the power station 20 with one or both of the carrying handles 34, and thus, the power station 20 may act as a convenient mobile power source. Since the carrying handles 34 are also able to support and secure other devices on top of the power station 20, the carrying handles 34 may also be considered supports 34.

The power station 20 typically includes an onboard battery system 36 including one or more batteries (not shown in FIG. 1) and a control system 38 positioned within the housing 22. The onboard battery system 36 may include a rechargeable lithium-ion battery 40 with a chemistry of either nickel manganese cobalt (NMC) or lithium iron phosphate (LFP). The control system 38 may include a converter (not shown in FIG. 1) for converting a voltage from the onboard battery system 36 into another voltage required to operate the electrical devices. The control system 38 may include an inverter 42 to change DC power from the onboard battery system 36 into AC power supplied to the electrical devices. For example, the inverter 42 may provide single or three phase AC power at 50 Hz or 60 Hz. Accordingly, the power station 20 may be referred to as a gasless inverter generator 20.

The power station 20 is shown with a control panel 46 located on a front sidewall 48 of the power station 20. The control panel 46 controls operation of the power station 20 and connects to one or more electrical devices powered by the power station 20. The control panel 46 includes one or more power output receptacles 50 (for example, sockets) that receive electrical connections (for example, plugs) from the electrical devices. The power output receptacles 50 are generally powered by the onboard battery system 36 via the control system 38. The one or more power output receptacles 50 are shown as a plurality of DC power output receptacles 52 and a plurality of AC power output receptacles 54, with the inverter 42 providing AC power to the AC power output receptacles 54.

The control panel 46 includes a power button 56 to turn on and off the power station 20. The power station 20 is turned on/off by the power button 56 when pressed and held for a short period of time. When the power station 20 is on, the power button 56 can also turn the AC power output receptacles 54 on/off when pressed without being held. The control panel 46 may include a display 58, also referred to as a user display panel, to show operating characteristics of the power station 20. The display 58 is typically an automatic display 58 displaying one or more items of information that the control system 38 automatically stores and updates without user input and will be referenced as the automatic display 58 below. However, in some embodiments, the display 58 may also display one or more items of information that control system 38 does not automatically update or may be configured in a manner that requires a manual input from a user for all information updates. In some embodiments, the power button 56 illuminates the automatic display 58 each time it is pressed. The automatic display 58 can display a battery level of the power station 20 to a person using the power station 20. Herein, the battery level of the power station 20 is also referred to as the energy level, charge level, or state of charge of the power station 20. The automatic display 58 may display the battery level in terms of percentages. As such, the battery level is also referenced herein as a percent battery level. The battery level of the onboard battery system 36 may correspond to the battery voltage.

The control system 38 is programmed to determine a THD associated with the AC power from the inverter 42 and to operate the automatic display 58 to indicate the THD to an operator. The automatic display 58 may indicate whether the THD is above a level that could damage sensitive electronic components powered by the inverter 42. High THD is generally caused by a high load on the AC power output receptacles 54 and/or by a low battery level powering the inverter 42. As the battery level drops, the AC power output can be too high for the inverter 42 to simulate a pure sine wave. In various embodiments, the battery level of the onboard battery system 36 corresponds to a voltage output from the battery. Thus, the THD may be determined based on power and voltage output from the power station 20.

The control system 38 may determine the power and voltage output from the power station 20 via measured voltage, current, and/or power values from one or more voltage, current, and/or power sensors (not shown) on the power station 20. Depending on the type of sensor used, the control system 38 may either utilize measured values from the sensors directly or calculate values based on the measured values. Thereafter, the control system 38 may determine the battery level based on the voltage of the onboard battery system 36 and calculate the percent battery level of the onboard battery system 36 at a point in time based on the determined battery level and the battery level capacity of the onboard battery system 36. The THD can therefore be reduced by unplugging one or more AC devices from the power station 20 and/or by charging the onboard battery system 36. If the power output is lower, the inverter 42 will be able to simulate a pure sine wave (for example, a waveform with a low THD) at a lower battery level and for a longer period of time prior to the onboard battery system 36 being recharged.

The control system 38 may be programmed with a THD shield 60 to automatically shut off AC power output from the AC power output receptacles 54 when the THD is above a predetermined level (for example, 5%). The THD shield 60 of the control system 38 may automatically shut off AC power output when the onboard battery system 36 has a battery level below a predetermined battery level, which can indicate that the THD is above a predetermined THD level. In various embodiments, at full AC load (for example, 1,600 Watts (1,600 W)), the THD will rise above 5% at less than 20-25% battery level remaining, and at low loads (for example, 100 W), the THD will not rise above 5% until the onboard battery system 36 is basically dead. Since a charged or partially charged battery might have low THD even at full load, the THD shield 60 could be configured to determine that the battery level of the onboard battery system 36 is lower than a predetermined battery level prior to determining if the THD requires shutting off AC power output. In various embodiments, the predetermined battery level is approximately 30% of a battery level of the onboard battery system 36 when the onboard battery system 36 is at 100% battery level or fully charged and the predetermined THD level is approximately 5%. The DC power output receptacles 52 can remain powered even if the AC power output receptacles 54 are shut off by the THD shield 60.

An overload reset button 62, also referred to as a THD shield button 62, can be pressed to re-energize the DC and AC power output receptacles 52, 54 if they have been shut off due to an electrical fault. The overload reset/THD shield button 62 may also provide a user input control to selectively enable the THD shield 60 while the automatic display 58 indicates whether the THD shield 60 is enabled or disabled. In various embodiments, a user may press the overload reset/THD shield button 62 once to re-energize both AC power output receptacles 54 and DC power output receptacles 52 after an overload fault and five times in three seconds to turn the THD shield 60 on or off. When the THD shield 60 is on and the THD rises above a predetermined level, also referred to as a THD fault level, the control system 38 shuts off AC power output to prevent damage to sensitive electronics. A user may press the overload reset/THD shield button 62 to restore AC power to the AC power output receptacles 54 following a THD shutoff. An LED light 64 that can illuminate a work area in front of the power station 20 is positioned above the control panel 46 adjacent the overload reset button 62 and an LED light button 66 that turns on the LED light 64.

In various embodiments, to restore AC output after the control system 38 shuts off power according to the THD shield 60, a user should charge the power station 20 (if possible), lower the AC running watts by unplugging one or more electrical devices, and press the overload reset button 62 to re-energize the AC power output receptacles 54. In various embodiments, to prevent control system 38 from shutting off power due to the THD shield 60, a user should maintain a high battery level in the onboard battery system 36, charge the power station 20 during use, unplug high current draw AC appliances to lower the AC running watts when the battery falls to near 30% charge capacity, and/or turn off the THD shield 60. In various embodiments, to turn the THD shield 60 off, a user should lower the AC running watts by unplugging one or more devices to limit increasing THD levels as the battery level depletes and press the THD shield button 62 five times within three seconds. When the THD shield 60 is disabled, the control system 38 will not shut off AC power output when the THD rises above the predetermined level. A user should monitor sensitive devices for abnormal operation and disconnect as necessary.

Figure 2:
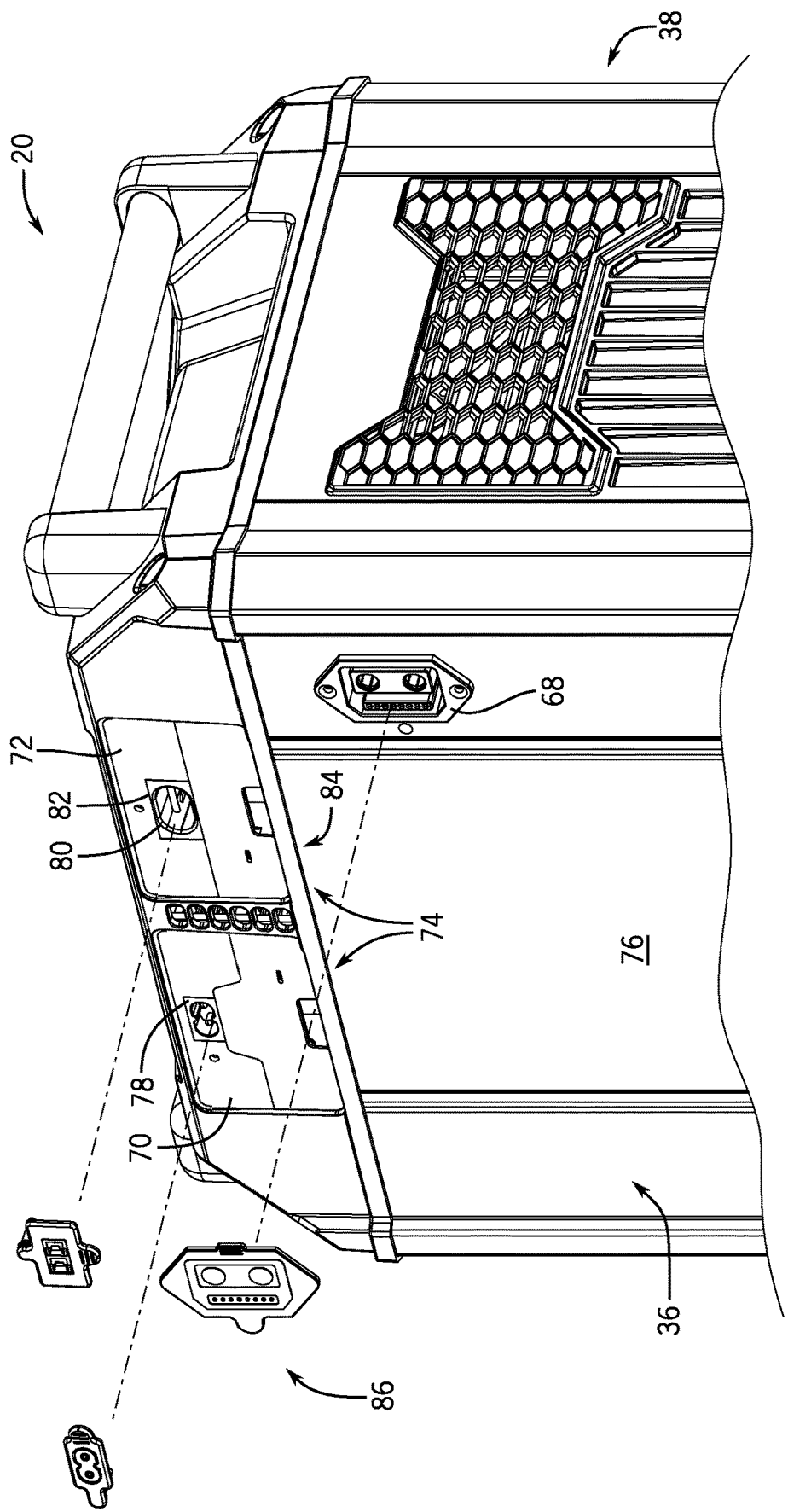
FIG. 2 is a partial lower-left rear perspective view of the power station of FIG. 1 with power receptacle covers exploded from the power station, according to an embodiment of the invention.

Referring now to FIG. 2, a partial lower-left rear perspective view of the power station 20 is shown with receptacle covers 86 exploded therefrom, according to an embodiment of the invention. The power station 20 includes an external battery port 68 to connect one or more expansion batteries (not shown in FIG. 2), as explained in more detail below with respect to FIG. 6. The power station 20 may couple to a single expansion battery or to a string of expansion batteries (for example, up to ten or more) to increase the battery or energy capacity and runtime of the power station 20. The control system 38 couples the onboard battery system 36 and the external battery port 68 to each of the power output receptacles 50 (FIG. 1).

FIG. 2 shows an AC charging module 70 and a DC charging module 72 that charge the onboard battery system 36 from an AC power source (not shown in FIG. 2) and a DC power source (not shown in FIG. 2), respectively. The AC charging module 70 and the DC charging module 72 are positioned within charging module slots 74 in the rear sidewall 76 of the power station 20. Charging terminals (not shown in FIG. 2) are located within the charging module slots 74 and electrically connect the AC and DC charging modules 70, 72 to the power station 20 when the charging modules 70, 72 are inserted into the charging module slots 74. If a charging module with a different electrical configuration is desired, the AC charging module 70 and the DC charging module 72 can be removed from the charging module slots 74 for replacement.

The AC and DC charging modules 70, 72 have respective AC and DC power inlet receptacles 78, 80 each coupled to the onboard battery system 36 to recharge the power station 20. The AC charging module 70 may include a rectifier (not shown in FIG. 2) to convert AC power from an AC source into DC power supplied to the onboard battery system 36. The AC power inlet receptacle 78 may charge the power station 20 from a traditional wall outlet (not shown in FIG. 2) connected to the utility grid (not shown in FIG. 2). The DC power inlet receptacle 80 may include an APP (Anderson Power Pole) input port 82 that can support DC charging from one or more solar panels (not shown in FIG. 2). The DC charging module 72 may include a maximum power point tracking (MPPT) module 84 to optimize charging of the onboard battery system 36 from the solar panels. The receptacle covers 86 protect the external battery port 68, the AC power inlet receptacle 78, and the DC power inlet receptacle 80 from moisture, dirt, and other debris.

Figure 3:
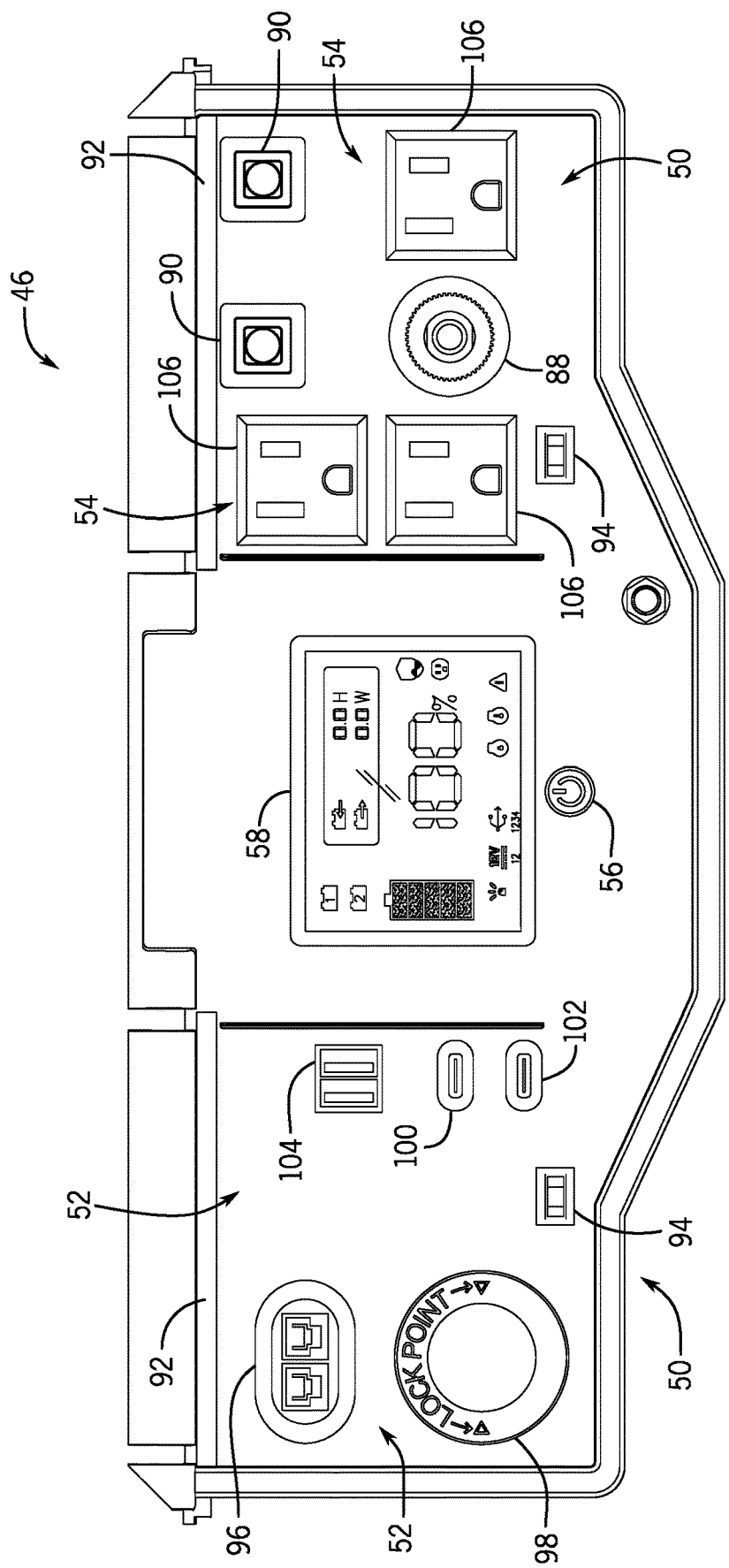
FIG. 3 is a front view of a control panel of the power station of FIG. 1, according to an embodiment of the invention.

Referring now to FIG. 3, a front view of the control panel 46 of the power station 20 of FIG. 1 is shown, according to an embodiment of the invention. The control panel 46 includes a power button 56 to turn on and off the power station 20 and to illuminate the automatic display 58. The automatic display 58 can indicate the battery level available from the onboard battery system 36 and any connected expansion batteries (not shown in FIG. 3) to a user. The control panel 46 also includes a circuit breaker 88, linking module connection ports or linking kit connection ports 90, and a plurality of selectively openable protective covers 92. The circuit breaker 88 protects the power station 20 against electrical overloads and can be pressed by an operator to reset power to the power output receptacles 50. The linking module connection ports 90 are used to electrically couple AC power outputs from the linking module connection ports 90 of two power stations 20 to a linking kit or module (not shown in FIG. 3) that is able to provide an increased AC power output. The protective covers 92 are hinged to the control panel 46 to selectively cover the power output receptacles 50 and are latched in closed positions by depressible cover locks 94.

The control panel 46 is shown with a plurality of DC power output receptacles 52 that are powered by the onboard battery system 36 and/or any connected expansion batteries (not shown in FIG. 3) and that may output different levels of voltage and current. For example, an APP (Anderson Power Pole) port 96 may supply electrical power for operation of 12-volt (12V) DC, 20-amp (20A) electrical loads. A regulated automotive port 98 may supply electrical power for operation of 12V DC, 10A electrical loads. A plurality of Universal Serial Bus (USB) ports may provide power to devices such as, for example, cellphones, laptops, and tablets. A USB Type-C+Power Delivery (PD) port 100 may supply 5V/9V/12V/15V/20V DC, 3A Fixed or 3.3V-21V DC according to the Programmable Power Supply (PPS) protocol to provide power up to a maximum of 60 watts (60 W) with PD compatible devices. A USB Type-C+Quick Charge (QC) port 102 may supply 3.6V-12V DC, 3A Fixed (for example, 5V/9V, 3A Fixed or 12V, 2.5A Fixed) or 3.6V-12V DC PPS to provide power up to a maximum of 30 W with QC 3.0 compatible devices. USB Type-A ports 104 may supply a maximum of 5V DC, 2.1A.

The control panel 46 is also shown with a plurality of AC power output receptacles 54 that are powered by the onboard battery system 36 and/or any expansion batteries (not shown in FIG. 3). For example, National Electrical Manufacturers Association (NEMA) 5-15R ports 106 may be used to supply electrical power for operation of 120V AC, 15A, single phase, 60 Hz electrical loads. However, the AC power output receptacles 54 may provide power from the inverter at any suitable current (for example, any integer or half-integer value from 2.5A to 30A) and voltage (for example, any integer value from 110V to 120V AC or any integer value from 220V to 250V AC). In various embodiments, the power button 56 turns on the inverter 42 (FIG. 1) to power the AC power output receptacles 54 while the DC power output receptacles 52 are configured to always receive power.

Figure 4:
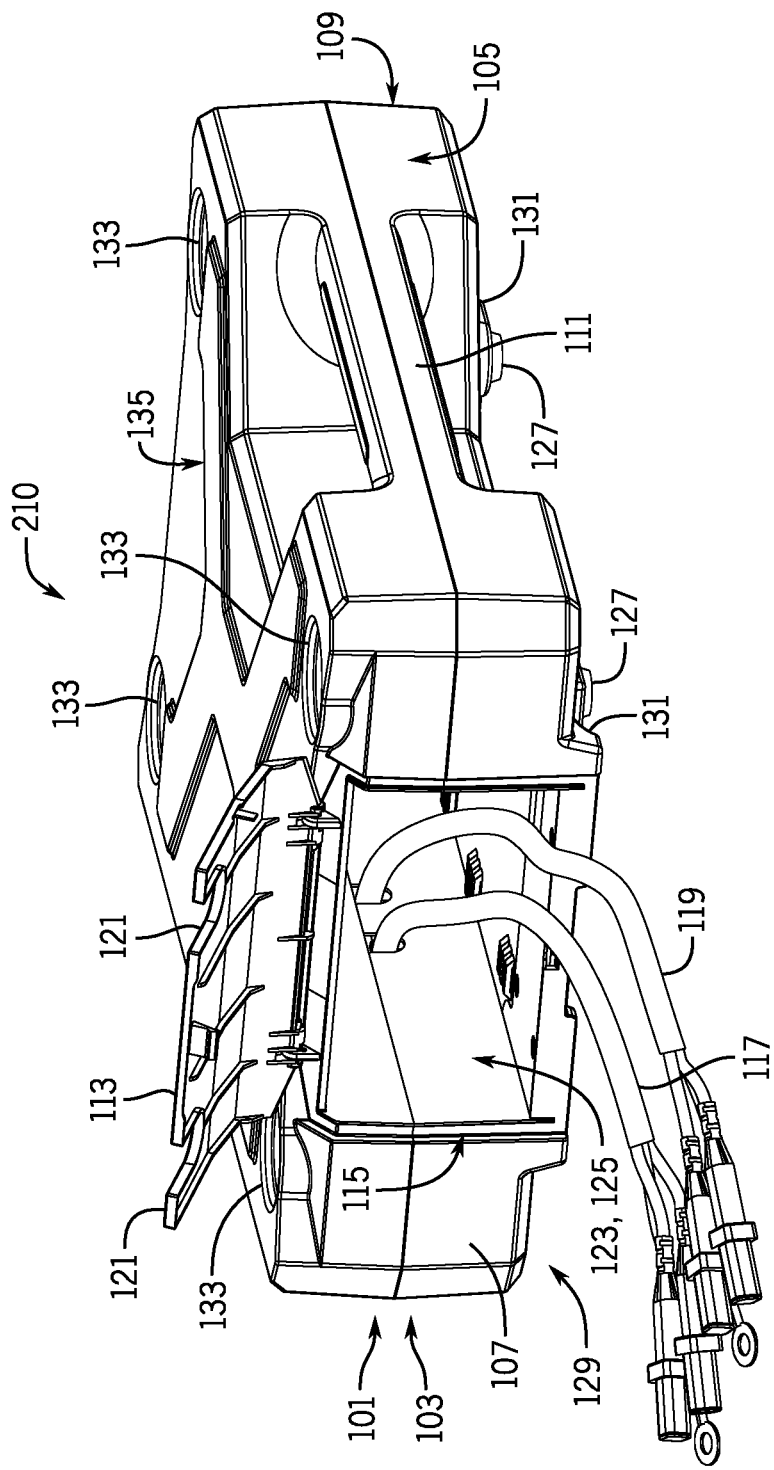
FIG. 4 is an upper-right rear perspective view of a linking module to couple the power station of FIG. 1 to another power station, according to an embodiment of the invention.

Referring now to FIG. 4, an upper-right rear perspective view of a linking module 210 configured to combine power received from two connectable inverter power stations 20 (FIG. 1) is shown, according to an embodiment of the invention. The linking module 210 (also referred to as a linking kit 210, link 210, or paralink 210) may electrically connect to at least one AC power output receptacle (for example, the linking module connection ports 90 (FIG. 3)) of a first power station 20 (not shown in FIG. 4) and a second power station 20 (not shown in FIG. 4) to receive respective first and second AC power outputs therefrom and to combine the first and second AC power outputs into a third AC power output. The linking module 210 may provide the third AC power output to an electrical device (not shown in FIG. 4) coupled to one or more power output receptacles (not shown in FIG. 4) of the linking module 210.

Figure 5:
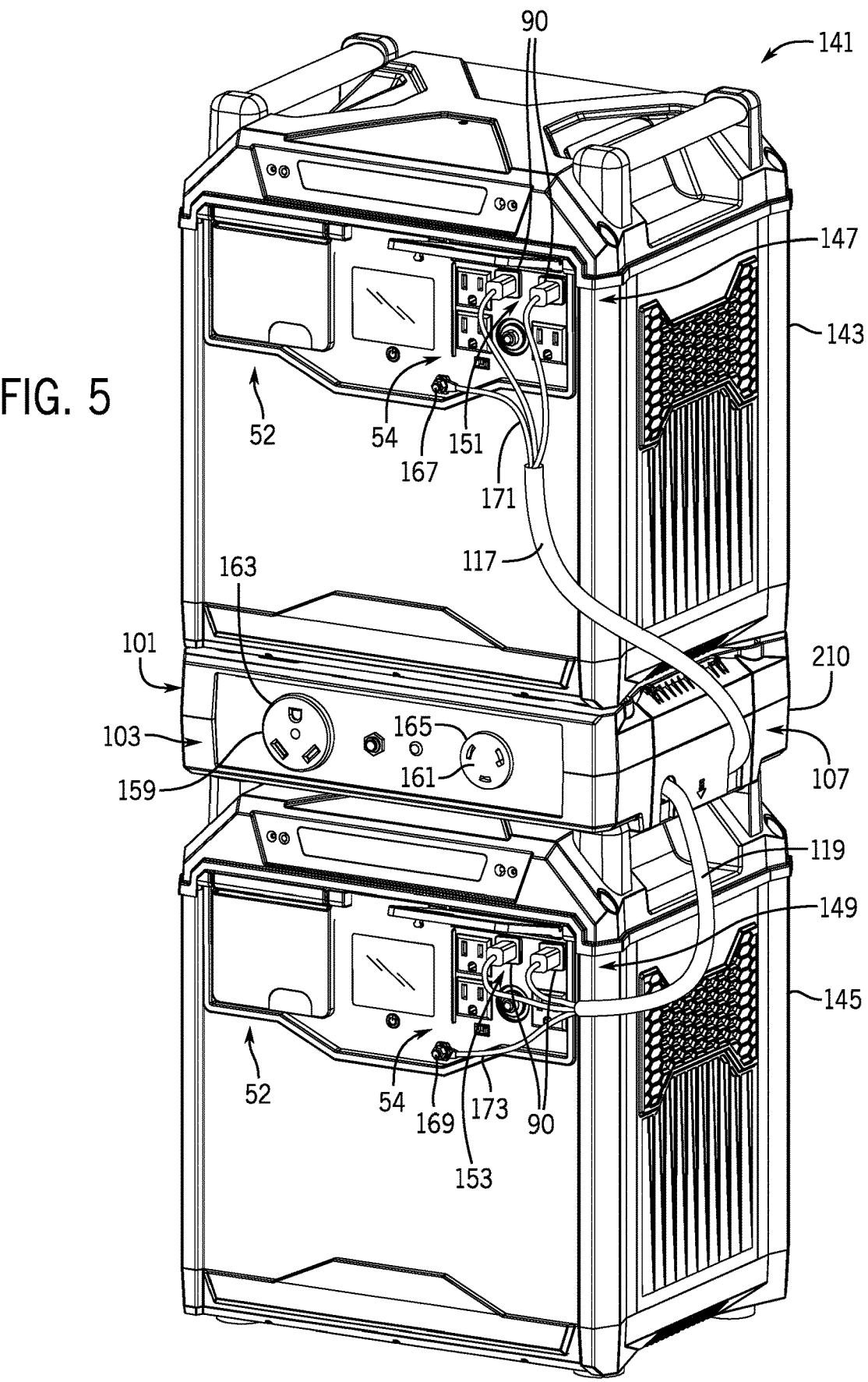
FIG. 5 is an upper-right front perspective view of a first and a second power station of the type shown in FIG. 1 coupled to the linking module of FIG. 4 in a stacked configuration, according to an embodiment of the invention.

In various embodiments of the invention, the linking module 210 includes a housing 101 that has a generally rectangular shape with a front end 103, a back end 105, a right side 107, and a left side 109. A handle 111 is positioned at the back end 105 of the housing 101, and a hinged door 113 is positioned at the right side 107 of the housing 101. The linking module 210 is shown in FIG. 4 with the hinged door 113 in an open position to expose an interior compartment 115 in the housing 101 and with first and second pairs of connection cables 117, 119 extending out of the interior compartment 115. The pairs of connection cables 117, 119 are couplable to the linking module connection ports 90 of the power stations 20 to receive power therefrom. The hinged door 113 may close over the pairs of connection cables 117, 119 with the cables extending through slots 121 in the hinged door 113 when the hinged door 113 is closed, as shown in FIG. 5. The hinged door 113 can be opened to easily place the pairs of connection cables 117, 119 inside the housing 101 for storage and to access internal components within the housing 101. The linking module 210 may also include a control system 123 positioned therein to operate the linking module 210 and a converter 125 for converting power received from the power stations 20 into a desired form with voltages and currents that are optimally suited for user loads.

The linking module 210 may include a plurality of feet 127 extending downward from a bottom surface 129 of the housing 101 to secure the linking module 210 in a stacked configuration with a power station 20 or to raise the housing 101 slightly off of the floor or ground. Arc-shaped cutouts 131 are shown extending across the bottom surface 129 of the housing 101 in a direction from the front end 103 to the back end 105 of the linking module 210 and extending through the feet 127. In various embodiments, the linking module 210 stacks on a power station 20 with the arc-shaped cutouts 131 sitting securely on the oval-shaped carrying handles 34 (FIG. 1) of the power station 20. While shown as arc-shaped in FIG. 4, the cutouts 131 may have a different shape in various embodiments. In many embodiments, the shape of the cutouts 131 will correspond to the shape of the carrying handles 34 such that the carrying handles 34 are able to safely support the linking module 210.

The linking module 210 may also include power station mounts 133 on an upper surface 135 thereof to receive and secure the plurality of feet 32 (FIG. 1) from a power station 20 stacked thereon. The power station mounts 133 are shown as circular mounting indentations that match a corresponding geometry of the feet 32. Although the power station mounts 133 of the linking module 210 and the feet 32 of the power station 20 are described with particular shapes or configurations, in various embodiments, other shapes or configurations may be used. Accordingly, the linking module 210 may stack between two power stations 20, with the linking module 210 secured on the oval-shaped carrying handles 34 (FIG. 1) and another power station 20 secured on power station mounts 133 of the linking module 210.

Referring now to FIG. 5, an upper-right front perspective view of a power station assembly 141 is shown, according to an embodiment of the invention. The power station assembly 141 may include a first inverter power station 143, a second inverter power station 145, and the linking module 210 of FIG. 4 in a stacked configuration. The first and second inverter power stations 141, 143 are arranged similarly to the power station 20 of FIG. 1, and hence, like elements therein are numbered identically to corresponding elements in the power station 20 of FIG. 1. The first inverter power station 143 may be configured to provide a first AC power output at an AC voltage and a first AC current at or below a first AC current rating of the first inverter power station 143, and the second inverter power station 145 may be configured to provide a second AC power output at the AC voltage and a second AC current at or below a second AC current rating of the second inverter power station 145. The first inverter power station 143 may include a power output receptacle 147 configured to provide the first AC power output, and the second inverter power station 145 may include a power output receptacle 149 configured to provide the second AC power output.

In various embodiments of the invention, the linking module 210 may be a parallel link 210 capable of providing an AC power output that combines the AC power outputs from the two inverter power stations 143, 145 in parallel. In other embodiments of the invention, the linking module 210 may be a series link capable of providing an AC power output that combines the AC power outputs from the two inverter power stations 143, 145 in series. The power output receptacles 147, 149 of the first and second inverter power stations 143, 145 may include respective pairs of linking module connection ports 90 each coupled to one of the first and second pairs of connection cables 117, 119 of the linking module 210 extending through the slots 121 in the hinged door 113 in the right side 107 of the linking module 210, as shown in FIG. 5. In other embodiments of the invention, the power output receptacles 147, 149 of the first and second inverter power stations 143, 145 may include AC power output receptacles 54 which may be configured to power the linking module 210 or an external electrical device (not shown in FIG. 5). In various embodiments, the linking module 210 couples to the DC power output receptacles 52 of the first and second inverter power stations 143, 145 to receive power therefrom.

In various embodiments, the linking module 210 connects the first and second inverter power stations 143, 145 in parallel and therefore the linking module connection ports 90 may be respective pairs of parallel AC power output receptacles 151, 153. That is, the first inverter power station 143 may include a first pair of parallel AC power output receptacles 151, and the second inverter power station 145 may include a second pair of parallel AC power output receptacles 153. Each pair of parallel cables 117, 119 are electrically connectable to the first and second pairs of parallel AC power output receptacles 151, 153 and configured to electrically connect to one of the first and second pairs of parallel AC power output receptacles 151, 153 at a time to receive the first AC power output or the second AC power output. In FIG. 5, the first pair of parallel AC power output receptacles 151 of the first power inverter station 143 is coupled to the first pair of connection cables 117 of the linking module 210, and the second pair of parallel AC power output receptacles 153 of the second inverter power station 145 is coupled to the second pair of connection cables 119.

The linking module 210 may be configured to electrically connect to the first inverter power station 143 to receive the first AC power output therefrom, electrically connect to the second inverter power station 145 to receive the second AC power output therefrom, and combine the first and second AC power outputs into a third AC power output at the AC voltage and a third AC current that is a combination of the first and second AC current. The linking module 210 may also be configured to provide the third AC power output to an electrical load (not shown in FIG. 5) at the AC voltage and the third AC current at or below a third AC current rating that is a combination of the first and second AC current ratings. In various embodiments, the third AC current rating may be equal to a sum of the first and second AC current ratings.

In various embodiments, the linking module 210 includes one or more power output receptacles 159, 161 configured to provide the third AC power output, and the third AC current rating may be an AC current rating of the power output receptacles 159, 161. For example, the linking module 210 may include at least one AC power output receptacle 159, 161 configured to provide a third AC power output at the AC voltage and a third AC current that is a combination of the first and second AC currents of the first and second inverter power stations 143, 145 and that does not exceed a third AC current rating of the linking module 210, the third AC current rating being higher than each of the first and second AC current ratings. The at least one AC power output receptacle 159, 161 of the linking module 210 may have a voltage rating equal to a voltage rating of the power output receptacles 147, 149 of the first and second inverter power stations 143, 145. In various embodiments, the one or more power output receptacles 159, 161 of the linking module 210 includes a 120V AC, 30A RV receptacle (or a NEMA TT-30R receptacle) 163 and a 120V AC, 30A locking receptacle (or a NEMA L5-30R receptacle) 165.

In various embodiments, the first inverter power station 143 includes a ground terminal 167, and the second inverter power station 145 includes a ground terminal 169. The linking module 210 may also include a first ground wire 171 electrically connectable to the ground terminals 167, 169 and configured to electrically connect to one of the ground terminals 167, 169 at a time. The linking module 210 may further include a second ground wire 173 electrically connectable to the first and second ground terminals 167, 169 and configured to electrically connect to one of the first and second ground terminals 167, 169 at a time. In FIG. 5, the first ground wire 171 of the linking module 210 is coupled to the ground terminal 167 of the first inverter power station 143, and second ground wire 173 of the linking module 210 is coupled to the ground terminal 169 of the second inverter power station 145.

Figure 6:
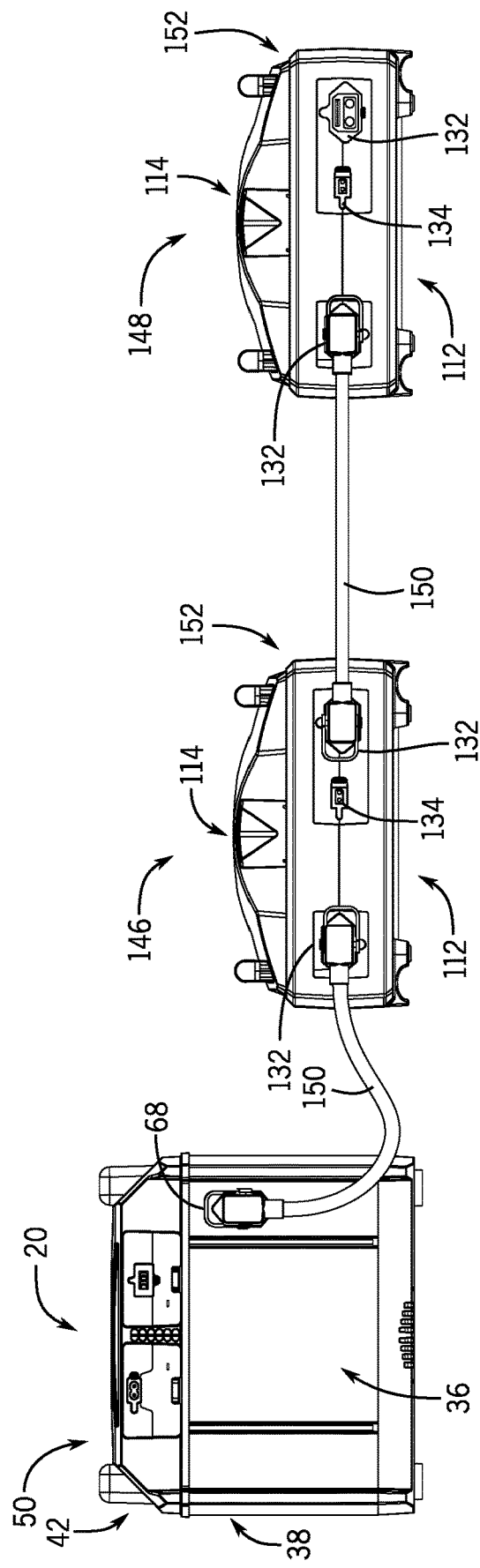
FIG. 6 is a rear view of the power station of FIG. 1 coupled to first and second expansion batteries, according to an embodiment of the invention.

Referring now to FIG. 6, a rear view of the power station 20 of FIG. 1 connected to a pair of expansion batteries 146, 148 is shown, according to an embodiment of the invention. In FIG. 6, the external battery port 68 of the power station 20 is connected to a first expansion battery 146 and a second expansion battery 148. Each expansion battery 146, 148 may include a pair of battery connection ports 132 that connect to the power station 20 or the other expansion battery 146, 148 using a connection cable 150. Up to ten or more expansion batteries 146, 148 may be chained to the power station 20 to provide additional power. Each expansion battery 146, 148 includes a battery system 112 (for example, a lithium-ion battery system) that increases the battery or energy capacity (watt-hours (Wh) or joules (J)) or runtime of the power station 20. Alternatively, the expansion batteries 146, 148 could be configured to increase the running power or starting power of the power station 20. Each expansion battery 146, 148 also includes a charging module input port 134 for charging the expansion battery 146, 148.

As explained above, the control system 38 of the power station 20 is electrically coupled to the onboard battery system 36 and the external battery port 68 and may include a converter (not shown in FIG. 6) configured to convert a DC voltage to another DC voltage. As a result, the control system 38 of the power station 20 may utilize the converter to convert the DC voltage from the battery systems 112 of the expansion batteries 146, 148 into another DC voltage for distribution from the power station 20. The control system 38 of the power station 20 may additionally include a power inverter 42 to change DC power from each expansion battery 146, 148 to AC power for distribution from the power station 20. In another embodiment, the control system 114 of each expansion battery 146, 148 could provide a DC or AC power to the power station 20 that matches the requirements of any of the power output receptacles 50 of the power station 20. Accordingly, the control system 114 of each expansion battery 146, 148 may include a converter and/or inverter 152 to change DC power from the battery into an AC power supplied to the power station 20. The expansion batteries 146, 148 may also charge the onboard battery system 36 of the power station 20.

Each expansion battery 146, 148 may be paired to the power station 20 so that the control system 38 of the power station 20 can operate the expansion batteries 146, 148. Each expansion battery 146, 148 can be paired by connecting the expansion battery 146, 148 directly to the power station 20 and enabling a pairing feature on the power station 20. According to various embodiments of the invention, a user of the power station 20 may pair the expansion batteries 146, 148 to the power station 20 by performing a series of steps separately for each expansion battery 146, 148. Below is an example in which expansion battery 146 is paired to the power station 20.

In a first step, the user pairing the expansion battery 146 turns on the power station 20 and unplugs all electrical devices therefrom including any additional expansion batteries already connected and/or paired to the power station 20. In a second step, the user connects the expansion battery 146 being paired by connecting its connection cable 150 to the external battery port 68 of the power station 20. In a third step, the user holds down the overload reset button 62 (FIG. 1) of the power station 20 and presses the power button 56 (FIG. 1) of the power station 20 twice. Finally, the LED light 64 (FIG. 1) on the power station 20 will turn on and flash three times in a fourth step. If the LED light 64 does not turn on or flash three times, the user can repeat the second and third steps while ensuring that only the expansion battery 146 is connected to the power station 20. Once the expansion battery 146 is paired with the power station 20, the control system 38 of the power station 20 is able to communicate with and provide instructions to the control system 114 of the expansion battery 146.

In order to pair additional expansion batteries (for example, the expansion battery 148) to the power station 20, the user must disconnect the paired expansion battery 146 and repeat steps one through four above. Once the expansion batteries 146, 148 are paired to the power station 20, the expansion batteries 146, 148 will remain paired to the power station 20 until they are manually unpaired. In various embodiments, unpairing the expansion batteries 146, 148 may be performed by powering down or shutting down the expansion batteries 146, 148, by repeating steps one through four above, or by either method.

Pairing the expansion batteries 146, 148 allows the control system 38 of the power station 20 to discharge the battery system 36, 112 with the highest battery level before discharging the remaining batteries. In various embodiments, the battery level corresponds to a battery voltage and only the battery system or systems 36, 112 with the highest voltage will discharge until the voltage drops to approximately the same voltage level of the battery system or systems 36, 112 with the next highest battery voltage. That is, additional non-discharging battery systems 36, 112 will begin to discharge simultaneously with discharging battery systems 36, 112 when the voltages of the discharging battery systems 36, 112 approximate the voltages of the non-discharging battery systems 36, 112. In various embodiments, the voltages are approximate when the voltage levels or battery levels are within a specific percentage of each other such as, for example, 1%, 2%, 3%, 4%, or 5%. However, in various embodiments, the voltages may be approximate when the voltage levels or battery levels are within a specific voltage level of the each other such as 1V or 2V, as non-limiting examples.

For example, the battery system 36, 112 with the highest battery level among the expansion batteries 146, 148 and the power station 20 could discharge first until the battery level is similar to the battery system 36, 112 that had the second highest battery level. The two battery systems 36, 112 will then discharge simultaneously to the level of the third highest battery level. Once all remaining battery levels are similar, each battery system 36, 112 will discharge simultaneously or at the same rate. Thus, the battery systems 112 of the expansion batteries 146, 148 may only begin discharging if their battery levels are equal to or greater than the battery level of the battery system 36 of the power station 20.

Figure 7:
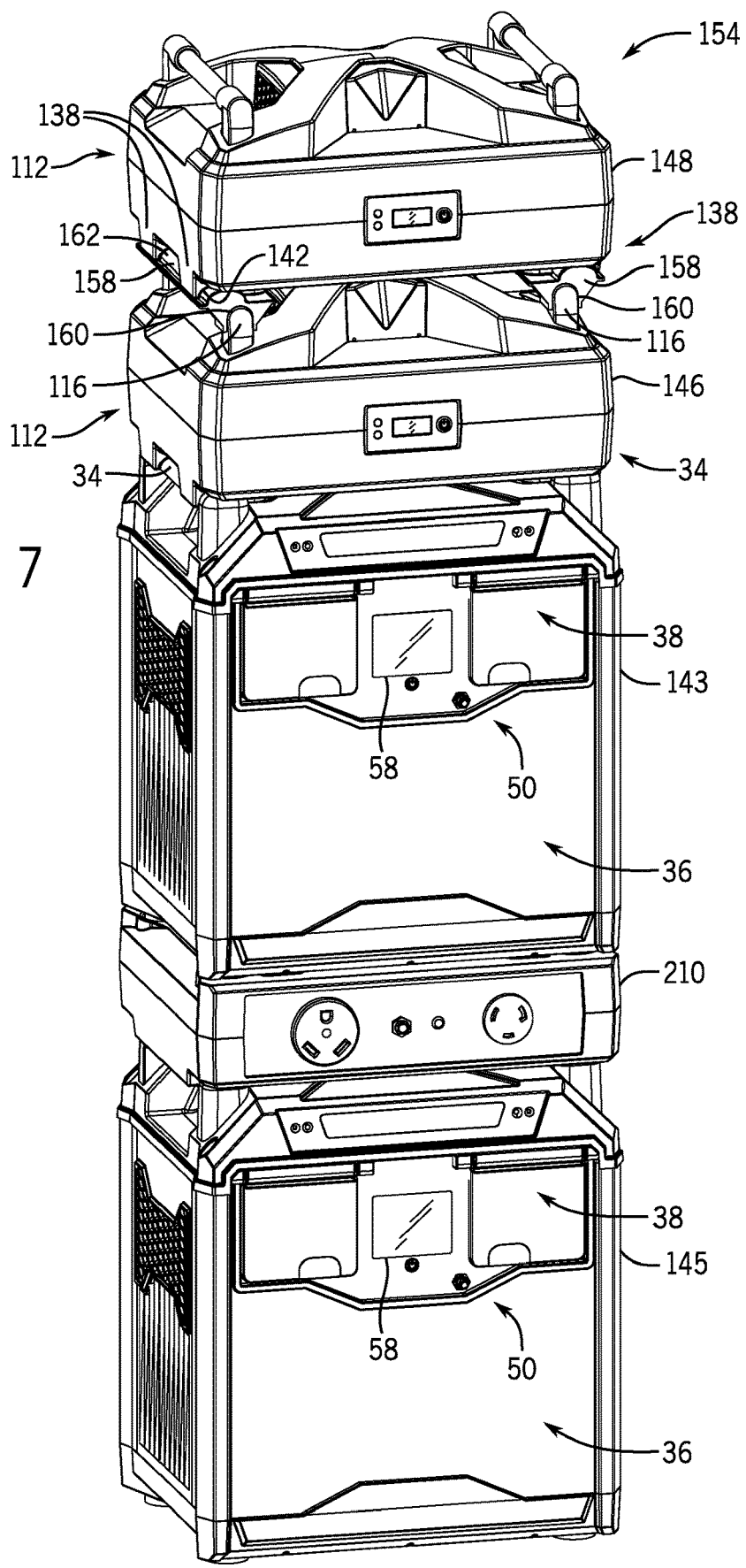
FIG. 7 is an upper-left front perspective view of a power station assembly including the first and second power stations and the linking module of FIG. 5 and the expansion batteries of FIG. 6 in a stacked configuration, with a pair of stack adaptors positioned on handles of the first expansion battery and the second expansion battery positioned on the first expansion battery via the pair of stack adaptors, according to an embodiment of the invention.

Referring now to FIG. 7, an upper-left front perspective view of a power station assembly 154 including the first and second inverter power stations 143, 145 and linking module 210 of FIG. 5 and the expansion batteries 146, 148 of FIG. 6 in a stacked configuration are shown, according to an embodiment of the invention. FIG. 7 shows the power station assembly 154 with two expansion batteries 146, 148 stacked on the first inverter power station 143, though any suitable number of expansion batteries could be stacked on the power station (for example, up to ten or more). The first expansion battery 146 is stacked directly on the carrying handles 34 of the first inverter power station 143. The second expansion battery 148 is stacked on the carrying handles 116 of the first expansion battery 146 via stacking adaptors 158. The stacking adaptors 158 sit or snap onto the carrying handles 116 of the first expansion battery 146 to secure the second expansion battery 148 to the first expansion battery 146.

The control system 38 of the first inverter power station 143 may be configured to determine a number of expansion batteries 146, 148 electrically coupled to the first inverter power station 143, determine a battery level of each expansion battery 146, 148, and calculate a battery level available to the first inverter power station 143 by adding the battery level of each expansion battery 146, 148. The control system 38 of the first inverter power station 143 may be programmed to sense each expansion battery 146, 148 coupled to the first inverter power station 143 by determining which expansion batteries 146, 148 are paired with the first inverter power station 143 and/or communicating with the control system 114 of each paired expansion battery 146, 148. The control system 38 may be programmed to determine the battery level of the battery system 112 of each expansion battery 146, 148 by reading the battery gauge 124 on each expansion battery 146, 148. The control system 38 may be programmed to add together the battery level of each expansion battery 146, 148 by adding together the percent battery level of each expansion battery 146, 148. In an alternative embodiment, the control system 38 may be configured to calculate a battery level available to the first inverter power station 143 by adding together the battery level of the onboard battery system 36 and the battery system 112 of each expansion battery 146, 148 electrically coupled to the first inverter power station 143. The automatic display 58 of the first inverter power station 143 operated by the control system 38 may display the available battery levels of the onboard battery system 36 and the battery systems 112 of the expansion batteries 146, 148.

The battery levels of the battery system 112 of each expansion battery 146, 148 electrically coupled to the first inverter power station 143 may include percent battery levels, and the battery level available to the first inverter power station 143 from battery system 36 and/or battery systems 112 may include a percent battery level relative to a capacity of the battery system 112 of a single expansion battery 146, 148 electrically coupled to the first inverter power station 143. The automatic display 58 may display the available battery level to the first inverter power station 143 as a percentage of a single expansion battery 146, 148 electrically coupled to the first inverter power station 143. That is, the automatic display 58 of the first inverter power station 143 may display that the total percent battery level is higher than 100% when the battery levels of the battery systems 112 of each expansion battery 146, 148 electrically coupled to the first inverter power station 143 have a total value greater than the capacity of the battery system 112 of a single expansion battery 146, 148. The automatic display 58 of the first inverter power station 143 may also display that the total percent battery level is higher than 100% when the battery levels of the battery system 36 of the first inverter power station 143 and each expansion battery 146, 148 electrically coupled to the first inverter power station 143 have a total value greater than the capacity of the battery system 112 of a single expansion battery 146, 148.

The control system 38 may calculate the power output and hours to empty for a particular load and operate the automatic display 58 to display the power output and/or hours to empty. The battery level available to the first inverter power station 143 is typically independent of an electrical load on the first inverter power station 143, but may be dependent on an electrical load on the first inverter power station 143 in some embodiments. Thus, the control system 38 may calculate the combined energy level of expansion batteries 146, 148 coupled to the first inverter power station 143 independent of or dependent on an electrical load on the power output receptacles 50.

As stated above, FIG. 7 shows a pair of stacking adaptors 158 positioned between the two expansion batteries 146, 148. Each stacking adaptor 158 has a lower surface with a semicircular cutout 160 extending a length of the stacking adaptor 158. The semicircular cutout 160 sits on rod-shaped carrying handles 116 of the first expansion battery 146. Each stacking adaptor 158 also has an oval-shaped upper surface 162 extending the length of the stacking adaptor 158. The second expansion battery 148 sits on the stacking adaptors 158 with the feet 138 of the second expansion battery 148 having arc-shaped cutouts 142 secured on the oval-shaped upper surface 162 of the stacking adaptors 158. Accordingly, the stacking adaptors 158 secure the feet 138 of the second expansion battery 148 to the rod-shaped carrying handles 116 of the first expansion battery 146 even if the feet 138 have a geometry that fits securely on oval-shaped carrying handles 34 of the first inverter power station 143. Although the handles 116 and feet 138 of the expansion batteries 146, 148 and the cutout 160 and oval-shaped upper surface 162 of the stacking adaptor 158 are described with particular shapes or configurations, in various embodiments, other shapes or configurations may be used. However, the handles 116 are typically designed for the comfort of a user.

Figure 8:
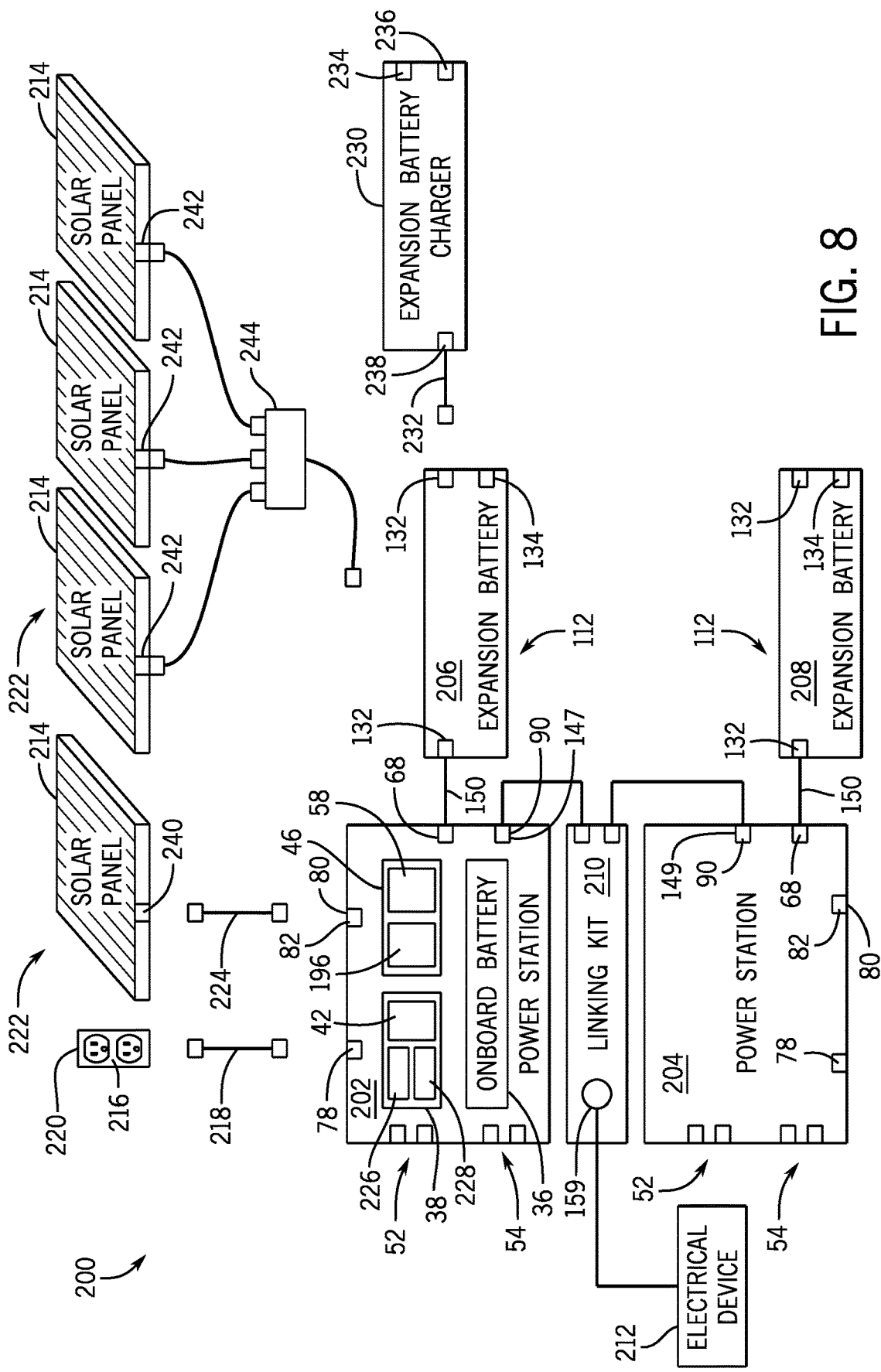
FIG. 8 is a block diagram of a power station assembly, according to an embodiment of the invention.

Referring now to FIG. 8, a block diagram of a power station assembly 200 is shown, according to an embodiment of the invention. The power station assembly 200 is shown with a first power station 202 coupled to a second power station 204 by the linking module 210 of FIG. 4, with the linking module 210 increasing the power output available to an electrical device 212 powered by the power station assembly 200. The first and second power stations 202, 204 are arranged similarly to the power station 20 of FIG. 1 and the first and second power stations 143, 145 of FIG. 5, and hence, like elements therein are numbered identically to corresponding elements in the power station 20 of FIG. 1 and the first and second power stations 143, 145 of FIG. 5. A first expansion battery 206 is coupled to the first power station 202, and a second expansion battery 208 is coupled to the second power station 204. The first expansion battery 206 and the second expansion battery 208 increase the capacity or runtime of the power station assembly 200. The expansion batteries 206, 208 are arranged similarly to the expansion batteries 146, 148 of FIG. 6, and thus, like elements therein are numbered identically to corresponding elements in the expansion batteries 146, 148 of FIG. 6.

The power stations 202, 204 may each include one or more linking module connection ports 90 configured to receive connections to the linking module 210. The linking module 210 may be used as a parallel link 210 to couple together the AC power outputs from the linking module connection ports 90 of the two power stations 202, 204 to increase output current or a series link to couple together the AC power outputs from the linking module connection ports 90 of the two power stations 202, 204 to increase output voltage. The power stations 202, 204 are also shown with an external battery port 68 configured to connect expansion batteries 206, 208, a DC power inlet receptacle 80 configured to connect to a DC power source 222 and an AC power inlet receptacle 78 configured to connect to an AC power source 216. The power stations 202, 204 may also include DC power output receptacles 52 and AC power output receptacles 54 configured to power electrical devices coupled to the power station 202, 204.

The AC power inlet receptacle 78 couples to the AC power source 216 using an AC cord 218. The AC power source 216 may be a traditional wall outlet 220 coupled to the utility grid. The AC power inlet receptacle 78 may support AC fast charging (for example, at 120V AC, 50 Hz/60 Hz, 4.5A MAX). The DC power inlet receptacle 80 may include an APP input port 82 configured to couple to the DC power source 222 using an APP cord 224. The DC power source 222 may include one or more solar panels 214. The APP input port 82 may support DC fast charging (for example, at 10V-28V DC, 25A MAX).

The power stations 202, 204 may also include a control system 38 including an inverter 42, a processor 226 and memory 228. While the inverter 42 is illustrated as part of the control system 38, the inverter 42 may be controlled by the control system 38 as a separate element therefrom. The processor 226 may be one or more computer processors or microprocessors capable of executing a computer program having instructions including executable code. The executable code may be stored on the memory 228 which may include any suitable non-transitory media that can store executable code for use by the processor 226 to perform the presently disclosed techniques. The memory 228 may be any suitable type of computer-readable media that can store the executable code, data, analysis of the data, or the like. The power stations 202, 204 may also include a control panel 46 having an automatic display 58 and a battery gauge 196.

The linking module 210 may be configured to electrically connect to the first power station 202 to receive a first AC power output at an AC voltage and a first AC current less than or equal to a first AC current rating and electrically connect to the second power station 204 to receive a second AC power output at the AC voltage and a second AC current less than or equal to a second AC current rating. The linking module 210 may also be configured to electrically connect the first and second AC power outputs in parallel to combine the first and second AC power outputs into a third AC power output at the AC voltage and a third AC current that is a combination of the first and second AC currents, and provide the third AC power output to an electrical device or load 212.

In various embodiments of the invention, each of the two connectable inverter power stations 202, 204 include at least one respective power output receptacle 147, 149 configured to provide a respective first and second rated AC power output. More specifically, the linking module 210 may be configured to electrically connect to the first power station 202 via a first AC power output receptacle 147 of the first power station 202, with the first AC current rating being an AC current rating of the first AC power output receptacle 147. The linking module 210 may be configured to electrically connect to the second power station 204 via a second AC power output receptable 149 of the second power station 204, with the second AC current rating being an AC current rating of the second AC power output receptacle 149. In various embodiments, first and second AC power output receptacles 147, 149 have an AC voltage of approximately 120V (within plus or minus 10V, or from 110V to 130V), and the first and second AC current ratings are approximately 15A (within plus or minus 3A, or from 12A to 18A).

In various embodiments of the invention, the power station assembly 200 may include two connectable inverter power stations 202, 204 each configured to provide a first rated AC power output at a first voltage rating and a first current rating. When the linking module 210 electrically connects the two connectable power stations 202, 204, the power station assembly 200 may include a second rated AC power output at the first voltage rating and a second current rating higher than the first current rating. According to various embodiments, when the linking module 210 electrically connects the two connectable power stations 202, 204, the linking module 210 is capable of providing the second rated AC power output. The linking module 210 may include at least one power output receptacle 159 configured to provide the second rated AC power output. Accordingly, the linking module 210 may include a second rated AC power output at the first voltage rating and a second current rating higher than the first current rating. The linking module 210 may be a parallel link 210 configured to couple the two connectable inverter power stations 202, 204 in parallel and capable of providing a rated AC power output that combines the rated AC power outputs from the two connectable inverter power stations 202, 204.

An expansion battery charger or charging module 230 is configured to charge the expansion batteries 206, 208. The expansion battery charging module 230 may receive power from the AC power source 216 and/or the DC power source 222 and supply the power to one expansion battery 206, 208 using a power cord 232. The expansion battery charging module 230 includes an AC input port 234, an APP input port 236, and a power DC output port 238. The AC input port 234 is configured to couple to an AC power source such as, for example, the AC power source 216 using the AC cord 218. The APP input port 236 is configured to couple to a DC power source such as, for example, the DC power source 222 using the APP cord 224.

The expansion batteries 206, 208 may include a charging module input port 134 that connects to the power output port 238 of the expansion battery charging module 230 using the power cord 232. The expansion batteries 206, 208 may also include a pair of battery connection ports 132 that couple to a battery connection port 132 of another expansion battery 206, 208 or to the external battery port 68 of a power station 202, 204. A connection cable 150 may electrically couple the expansion batteries 206, 208 to the power stations 202, 204 when coupled to one battery connection port 132 and one external battery port 68. The expansion batteries 206, 208 may each be connected to one or more additional expansion batteries (not shown in FIG. 8) to increase the battery capacity available to the power stations 202, 204.

In various embodiments, the solar panels 214 of the DC power source 222 may be rated between 10V-28V with MC4 or APP connectors and may power one or more of the power stations 202, 204 or the expansion batteries 206, 208 via the expansion battery charging module 230. The solar panels 214 may include APP connectors 240 that can be coupled directly to the APP input ports 82 of the power stations 202, 204 or the APP input port 236 of the expansion battery charging module 230. The solar panels 214 may alternatively include MC4 connectors 242 that can be connected to the APP input ports 82, 236 using an MC4 to APP solar charge harness 244. The solar charge harness 244 may have an APP plug connectable to the power stations 202, 204 and the expansion battery charging module 230 with MC4 connections such as, for example, three MC4 connections to couple up to three or more solar panels 214 having MC4 connectors 242.

In some embodiments, the capacity of the onboard battery system 36 and/or each expansion battery 206, 208 could have an approximate (within plus or minus 5%) capacity of 1600 Wh or 3200 Wh. The onboard battery system 36 and/or each battery system 112 of the expansion batteries 206, 208 may have a rated output voltage of approximately 46.8V and a max output voltage of approximately 54.6V-55V, although the battery systems 36, 112 could have any suitable voltage rating such as 12V, 24V, or 48V, as non-limiting examples. The percent battery level of the battery systems 36, 112 may correspond to the battery voltage. As a non-limiting example, 100% battery level could correspond to 55V, and 0% battery level could correspond to 38V. In some embodiments, when power stations 202, 204 operate at full load, they will not reach 5% THD until the voltage drops to 42.57V with 17% battery capacity, and when power stations 202, 204 operate at full load with double the battery capacity, they will not reach 5% THD until the voltage drops to 42.70V with 11% battery capacity. In various embodiments, the power stations 202, 204 may each provide single phase AC power at 60 Hz with a current rating of approximately 13.3A at 120V.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not listed may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

Beneficially, embodiments of the invention provide a system for connecting a plurality of power stations to increase the capacity and/or power available to an electrical load powered by the power stations. Embodiments of the invention also provide a power station assembly including a linking module or kit connectable to a plurality of power stations to increase the available power output to the electrical load. The linking kit may include a power output receptacle with a rated power output that is higher than a rated power output of power output receptacles of the power stations.

Therefore, according to one embodiment of the invention, a power station assembly includes a first inverter power station configured to provide a first AC power output at an AC voltage and a first AC current at or below a first AC current rating and a second inverter power station configured to provide a second AC power output at the AC voltage and a second AC current at or below a second AC current rating. The power station assembly additionally includes a linking module configured to electrically connect to the first inverter power station to receive the first AC power output therefrom, electrically connect to the second inverter power station to receive the second AC power output therefrom, combine the first and second AC power outputs into a third AC power output at the AC voltage and a third AC current that is a combination of the first and second AC currents, and provide the third AC power output to a load at the AC voltage and the third AC current at or below a third AC current rating that is a combination of the first and second AC current ratings According to another embodiment of the invention, a gasless inverter generator system includes a first gasless inverter generator having at least one AC power output receptacle configured to provide a first AC power output at an AC voltage and a first AC current not exceeding a first AC current rating and a second gasless inverter generator having at least one AC power output receptacle configured to provide a second AC power output at the AC voltage and a second AC current not exceeding a second AC current rating. The gasless inverter generator system further includes a linking kit electrically connectable to the at least one AC power output receptacle of the first gasless inverter generator and the at least one AC power output receptacle of the second gasless inverter generator to receive the first and second AC power outputs therefrom and combine the first and second AC power outputs into a third AC power output. The linking kit includes at least one AC power output receptacle configured to provide the third AC power output at the AC voltage and a third AC current that is a combination of the first and second AC currents and that does not exceed a third AC current rating. The third AC current rating is higher than each of the first and second AC current ratings.

According to yet another embodiment of the invention, a linking module is configured to electrically connect to a first inverter power station to receive a first AC power output at an AC voltage and a first AC current less than or equal to a first AC current rating, electrically connect to a second inverter power station to receive a second AC power output at the AC voltage and a second AC current less than or equal to a second AC current rating, electrically connect the first and second AC power outputs in parallel to combine the first and second AC power outputs into a third AC power output at the AC voltage and a third AC current that is a combination of the first and second AC currents, and provide the third AC power output to a load.

According to yet another embodiment of the invention, a power station assembly includes two connectable inverter power stations and a linking module configured to electrically connect the two connectable inverter power stations. Each of the two connectable inverter power stations includes a first rated AC power output at a first voltage rating and a first current rating. When the linking module electrically connects the two connectable inverter power stations, the power station assembly is capable of providing a second rated AC power output at the first voltage rating and a second current rating higher than the first current rating.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. The singular forms 'a', 'an', and 'the' in the claims include plural reference unless the context clearly dictates otherwise. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A power station assembly comprising:
   a first inverter power station configured to provide a first AC power output at an AC voltage and a first AC current at or below a first AC current rating;
   a second inverter power station configured to provide a second AC power output at the AC voltage and a second AC current at or below a second AC current rating; and
   a linking module configured to:
      electrically connect to the first inverter power station to receive the first AC power output therefrom;
      electrically connect to the second inverter power station to receive the second AC power output therefrom;
      combine the first and second AC power outputs into a third AC power output at the AC voltage and a third AC current that is a combination of the first and second AC currents; and
      provide the third AC power output to a load at the AC voltage and the third AC current at or below a third AC current rating that is a combination of the first and second AC current ratings.

2. The power station assembly of claim 1 wherein each of the first and second inverter power stations are configured to electrically connect to one or more expansion batteries to receive power therefrom.

3. The power station assembly of claim 1 wherein:
   the first inverter power station comprises a first power output receptacle configured to provide the first AC power output;
   the second inverter power station comprises a second power output receptacle configured to provide the second AC power output; and
   the linking module comprises a third power output receptacle configured to provide the third AC power output.

4. The power station assembly of claim 1 wherein:
   the first inverter power station comprises a first pair of parallel AC power output receptacles;
   the second inverter power station comprises a second pair of parallel AC power output receptacles; and
   the linking module comprises two pairs of parallel cables, each pair of parallel cables electrically connectable to the first and second pairs of parallel AC power output receptacles and configured to electrically connect to one of the first and second pairs of parallel AC power output receptacles at a time to receive the first AC power output or the second AC power output.

5. The power station assembly of claim 4 wherein:
   the first inverter power station comprises a first ground terminal;
   the second inverter power station comprises a second ground terminal; and
   the linking module comprises:
      a first ground wire electrically connectable to the first and second ground terminals and configured to electrically connect to one of the first and second ground terminals at a time; and
      a second ground wire electrically connectable to the first and second ground terminals and configured to electrically connect to one of the first and second ground terminals at a time.

6. The power station assembly of claim 1 wherein the linking module comprises a 120V AC, 30A RV receptacle and a 120V AC, 30A locking receptacle.

7. A gasless inverter generator system comprising:
   a first gasless inverter generator comprising at least one AC power output receptacle configured to provide a first AC power output at an AC voltage and a first AC current not exceeding a first AC current rating;
   a second gasless inverter generator comprising at least one AC power output receptacle configured to provide a second AC power output at the AC voltage and a second AC current not exceeding a second AC current rating; and
   a linking kit electrically connectable to the at least one AC power output receptacle of the first gasless inverter generator and the at least one AC power output receptacle of the second gasless inverter generator to receive the first and second AC power outputs therefrom and combine the first and second AC power outputs into a third AC power output, the linking kit comprising at least one AC power output receptacle configured to provide the third AC power output at the AC voltage and a third AC current that is a combination of the first and second AC currents and that does not exceed a third AC current rating, the third AC current rating being higher than each of the first and second AC current ratings.

8. The gasless inverter generator system of claim 7 wherein the first gasless inverter generator and the second gasless inverter generator are each powered by an onboard lithium-ion battery and are each electrically connectable to one or more expansion batteries.

9. The gasless inverter generator system of claim 7 wherein:
   the at least one AC power output receptacle of the first gasless inverter generator comprises a first pair of parallel AC power output receptacles;
   the at least one AC power output receptacle of the second gasless inverter generator comprises a second pair of parallel AC power output receptacles; and
   the linking kit comprises two pairs of parallel cables, each pair of parallel cables electrically connectable to the first and second pairs of parallel AC power output receptacles and configured to electrically connect to one of the first and second pairs of parallel AC power output receptacles at a time to receive the first AC power output or the second AC power output.

10. The gasless inverter generator system of claim 7 wherein the third AC current rating is equal to a sum of the first and second AC current ratings.

11. The gasless inverter generator system of claim 7 wherein the at least one AC power output receptacle of the linking kit has a voltage rating equal to a voltage rating of the at least one AC power output receptacle of the first gasless inverter generator and the second gasless inverter generator.

12. A linking module configured to:
   electrically connect to a first inverter power station to receive a first AC power output at an AC voltage and a first AC current less than or equal to a first AC current rating;
   electrically connect to a second inverter power station to receive a second AC power output at the AC voltage and a second AC current less than or equal to a second AC current rating;

electrically connect the first and second AC power outputs in parallel to combine the first and second AC power outputs into a third AC power output at the AC voltage and a third AC current that is a combination of the first and second AC currents; and provide the third AC power output to a load.

13. The linking module of claim 12 wherein the linking module is configured to:
electrically connect to the first inverter power station via a first AC power output receptacle of the first inverter power station, with the first AC current rating being an AC current rating of the first AC power output receptacle; and
electrically connect to the second inverter power station via a second AC power output receptable of the second inverter power station, with the second AC current rating being an AC current rating of the second AC power output receptacle.

14. The linking module of claim 12 wherein the AC voltage is approximately 120V and the first and second AC current ratings are approximately 15A.

15. The linking module of claim 12 further comprising:
a first pair of parallel cables configured to electrically connect to a first pair of parallel AC power output receptacles of the first inverter power station; and
a second pair of parallel cables configured to electrically connect to a second pair of parallel AC power output receptacles of the second inverter power station.

16. The linking module of claim 15 wherein the linking module is electrically connectable to one or more expansion batteries via the first and second inverter power stations to receive power therefrom.

17. The linking module of claim 16 wherein the linking module is electrically connectable to twenty expansion batteries via the first and second inverter power stations.

18. The linking module of claim 12 wherein the linking module is capable of providing the third AC current at a level up to a third AC current rating that is a combination of the first and second AC current ratings.

19. The linking module of claim 18 further comprising at least one AC power output receptacle configured to provide the third AC power output.

20. The linking module of claim 19 wherein the at least one AC power output receptacle comprises a NEMA TT-30R receptacle and a NEMA L5-30R receptacle.

21. A power station assembly comprising:
two connectable inverter power stations each comprising a first rated AC power output at a first voltage rating and a first current rating; and
a linking module configured to electrically connect the two connectable inverter power stations; and
wherein, when the linking module electrically connects the two connectable inverter power stations, the power station assembly is capable of providing a second rated AC power output at the first voltage rating and a second current rating higher than the first current rating.

22. The power station assembly of claim 21 wherein the second current rating is a sum of the first current ratings of the two connectable inverter power stations.

23. The power station assembly of claim 21 wherein each of the two connectable inverter power stations are connectable to one or more expansion batteries to receive power therefrom.

24. The power station assembly of claim 21 wherein the linking module is configured to combine power received from the two connectable inverter power stations.

25. The power station assembly of claim 24 wherein, when the linking module electrically connects the two connectable inverter power stations, the linking module is capable of providing the second rated AC power output.

26. The power station assembly of claim 24 wherein the linking module is a parallel link capable of providing the second rated AC power output by combining the first rated AC power outputs from the two connectable inverter power stations in parallel.

27. The power station assembly of claim 24 wherein each of the two connectable inverter power stations comprises at least one power output receptacle configured to provide the first rated AC power output; and
the linking module comprises at least one power output receptacle configured to provide the second rated AC power output.

28. The power station assembly of claim 21 wherein each of the two connectable inverter power stations comprises:
a rechargeable lithium-ion battery, and
an inverter powered by the rechargeable lithium-ion battery to provide the first rated AC power output.

* * * * *